(12) United States Patent
Goossen

(10) Patent No.: US 12,452,985 B2
(45) Date of Patent: Oct. 21, 2025

(54) PREDICTING TUBE DEGRADATION VIA FILAMENT OR EXPOSURE FINGERPRINTS USING NEURAL NETWORKS

(71) Applicant: KONINKLIJKE PHILIPS N.V., Eindhoven (NL)

(72) Inventor: André Goossen, Eldena (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 171 days.

(21) Appl. No.: 18/032,360

(22) PCT Filed: Oct. 25, 2021

(86) PCT No.: PCT/EP2021/079452
§ 371 (c)(1),
(2) Date: Apr. 18, 2023

(87) PCT Pub. No.: WO2022/090110
PCT Pub. Date: May 5, 2022

(65) Prior Publication Data
US 2023/0389167 A1    Nov. 30, 2023

(30) Foreign Application Priority Data
Oct. 29, 2020  (EP) ..................................... 20204563

(51) Int. Cl.
*H05G 1/54*        (2006.01)
(52) U.S. Cl.
CPC ..................... *H05G 1/54* (2013.01)

(58) Field of Classification Search
CPC ...................................................... H05G 1/54
See application file for complete search history.

(56) References Cited

U.S. PATENT DOCUMENTS

| | | |
|---|---|---|
| 2007/0189463 A1 | 8/2007 | Deuringer |
| 2010/0189227 A1 | 7/2010 | Mannar |
| 2014/0177810 A1 | 6/2014 | Gao |
| 2015/0006093 A1 | 1/2015 | Hess |
| 2019/0317144 A1 | 10/2019 | Xu |

(Continued)

FOREIGN PATENT DOCUMENTS

CN    202051709 U    11/2011

OTHER PUBLICATIONS

PCT International Search Report, International application No. PCT/EP2021/079452, Feb. 10, 2022.

(Continued)

*Primary Examiner* — Chih-Cheng Kao
(74) *Attorney, Agent, or Firm* — Larry Liberchuk

(57) ABSTRACT

The present invention relates to a method and system for predicting X-ray degradation, the system comprising; a generator (10) configured to generate a deployment fingerprint data set for recording cumulative radiation exposure of a currently deployed X-ray tube; a database (20) configured to provide a training data set comprising multiple tube fingerprint data sets for recording cumulative radiation exposure of previously deployed X-ray tubes correlated with failures of the previously deployed X-ray tubes; and a neural network (30) configured to be trained using the training data set and configured to predict at least one parameter of the currently deployed X-ray tube based on the training.

9 Claims, 4 Drawing Sheets

(56) References Cited

U.S. PATENT DOCUMENTS

2020/0104200 A1    4/2020  Kocberber
2023/0395246 A1*  12/2023  Vogtmeier ............... H05G 1/54
2024/0206044 A1*   6/2024  Pronk .................... A61B 6/586
2025/0024577 A1*   1/2025  Korst .................... A61B 6/586

OTHER PUBLICATIONS

"Spellman High Voltage Electronics Corporation, Common X-ray Tube Failure Modes", https://www.spellmanhv.com/en/Technical-Resources/Application-Notes-X-Ray-Generators/AN-02, accessed Jun. 7, 2019.

* cited by examiner

PREDICTING TUBE DEGRADATION VIA FILAMENT OR EXPOSURE FINGERPRINTS USING NEURAL NETWORKS

FIELD OF THE INVENTION

The invention relates to a system for predicting X-ray tube degradation, to an X-ray tube arrangement, to a tube degradation predicting method, to a method of training a machine learning model, to a computer program element, and to a computer readable medium.

BACKGROUND OF THE INVENTION

Predictive maintenance and predictive service are in place for many modalities. Currently, they use dedicated models to retrospectively analyze data, e.g. log files or system parameters, in order to issue certain alarms, visualize trends, or rate system performance.

SUMMARY OF THE INVENTION

There may therefore be a need for improved X-ray tube degradation prediction.

The object of the present invention is achieved by the subject matter of the independent claims where further embodiments are incorporated in the dependent claims. It should be noted that the following described aspect of the invention equally applies to the system for predicting tube degradation, to X-ray tube arrangement, to a tube degradation predicting method, to a method of training a machine learning model, to a computer program element, and to a computer readable medium.

According to a first aspect of the invention there is provided a system for predicting X-ray tube degradation. The system comprises a generator configured to generate a deployment fingerprint data set for recording cumulative radiation exposure of a currently deployed X-ray tube. The system comprises a database configured to provide a training data set comprising multiple tube fingerprint data sets for recording cumulative radiation exposure of previously deployed X-ray tubes correlated with failures of the previously deployed X-ray tubes. The system comprises a neural network configured to be trained using the training data set and configured to predict at least one parameter of the currently deployed X-ray tube based on the training.

The present invention in contrast to the prior art allows that cumulated input parameters are used without the need to measure actual values within the tube or on the detector to map usage profiles a.k.a. fingerprints to tube lifetime.

The present invention can be implemented without hardware changes, generator access etc. for any system with access to basic exposure parameters and used not only to predict the remaining lifespan of that specific tube and plan service tasks, but also to derive (more) optimal usage profiles to maximize tube lifetime in a given setting, e.g. chest radiography, emergency room, fluoroscopy, trauma CT or the like.

According to an exemplary embodiment of the present invention, the neural network is configured to predict as the at least one parameter of the currently deployed X-ray tube an expected service lifetime of the currently deployed X-ray tube for a given tube fingerprint or distinct fingerprints for the different filaments per input channel.

According to an exemplary embodiment of the present invention, the expected service lifetime of the currently deployed X-ray tube is defined by a remaining number of exposure per filament, a total lifetime in number of exposures or days, a remaining lifetime in number of exposures or days, or a probability per failure mode.

According to an exemplary embodiment of the present invention, the probability per failure mode relates to an overall defect of the X-ray tube or a component defect of the X-ray tube, wherein optionally the component defect comprises a filament defect, an arcing defect, a bearing defect, a vacuum defect, or an anode defect.

According to an exemplary embodiment of the present invention, the generated deployment fingerprint data set is separated for different filaments per input channel.

According to an exemplary embodiment of the present invention, the neural network is configured to predict an ensemble of parameters of the currently deployed X-ray tube.

According to an exemplary embodiment of the present invention, the parameters are weighted to calculate a weighted parameter of the currently deployed X-ray tube.

The present invention in advantageous manner and according to an exemplary embodiment allows that in order to predict future system behavior from retrospective data analysis or a snapshot of the system state, a trained model is used that predicts lifetime parameters for the X-ray tube of a diagnostic radiographic machine.

With the power of hundreds and thousands of systems analyzed, an artificial intelligence is able to produce predictions that are much more precise than human prediction based on experience only. In other words, the present invention provides, in exemplary embodiment of the present invention, a lifetime or failure prediction that is based on a regression neural network that derives numerical parameters from a given input image, the tube fingerprint. During training, tube fingerprints with known later failures are fed into the model to train the lifetime parameters. In use, one or more tube fingerprints are fed into the network to receive predicted lifetime parameters that can be used to plan service actions on the corresponding system.

In another aspect there is provided a method of training the neural network of the system according to the first aspect or any implementation form of the first aspect.

In another aspect still, there is provided an X-ray imaging arrangement comprising an X-ray tube and a system according to the first aspect or any implementation form of the first aspect.

In another aspect still, there is provided a predicting method for predicting X-ray tube degradation, the method comprising the following steps, generating a deployment fingerprint data set for recording cumulative radiation exposure of a currently deployed X-ray tube; providing a training data set comprising multiple tube fingerprint data sets for recording cumulative radiation exposure of previously deployed X-ray tubes correlated with failures of the previously deployed X-ray tubes; and using the training data set to train a neural network and predicting at least one parameter of the currently deployed X-ray tube using the trained neural network.

In another aspect still, there is provided a computer program element, which, when being executed by at least one processing unit, is adapted to cause the processing unit to perform the method according to the previous aspect.

In another aspect still, there is provided at least one computer readable medium having stored thereon the program element, or having stored thereon the machine learning module.

In another aspect still, there is provided a deployment fingerprint data set for recording cumulative radiation exposure of a currently deployed X-ray tube.

In general, the "machine learning" includes a as classification. Some machine learning algorithms are model-based. A model-based ML algorithm operates to adjust parameters of a machine-learning model. This adjustment procedure is called "training". The model is thus configured by the training to perform the task. ML algorithms also include instance-based learning. Task performance by the ML algorithm improves measurably, the more (new) training data is used in the training. The performance may be measured by objective tests when feeding the system with test data. The performance may be defined in terms of a certain error rate to be achieved for the given test data.

These and other aspects an embodiments of the present invention will become apparent from and elucidated with reference to the embodiments and the figures as described hereinafter.

BRIEF DESCRIPTION OF THE DRAWINGS

Exemplary embodiments of the invention will now be described with reference to the following drawings, which, unless stated otherwise, are not to scale, wherein.

DETAILED DESCRIPTION OF EMBODIMENTS

Figure 1:
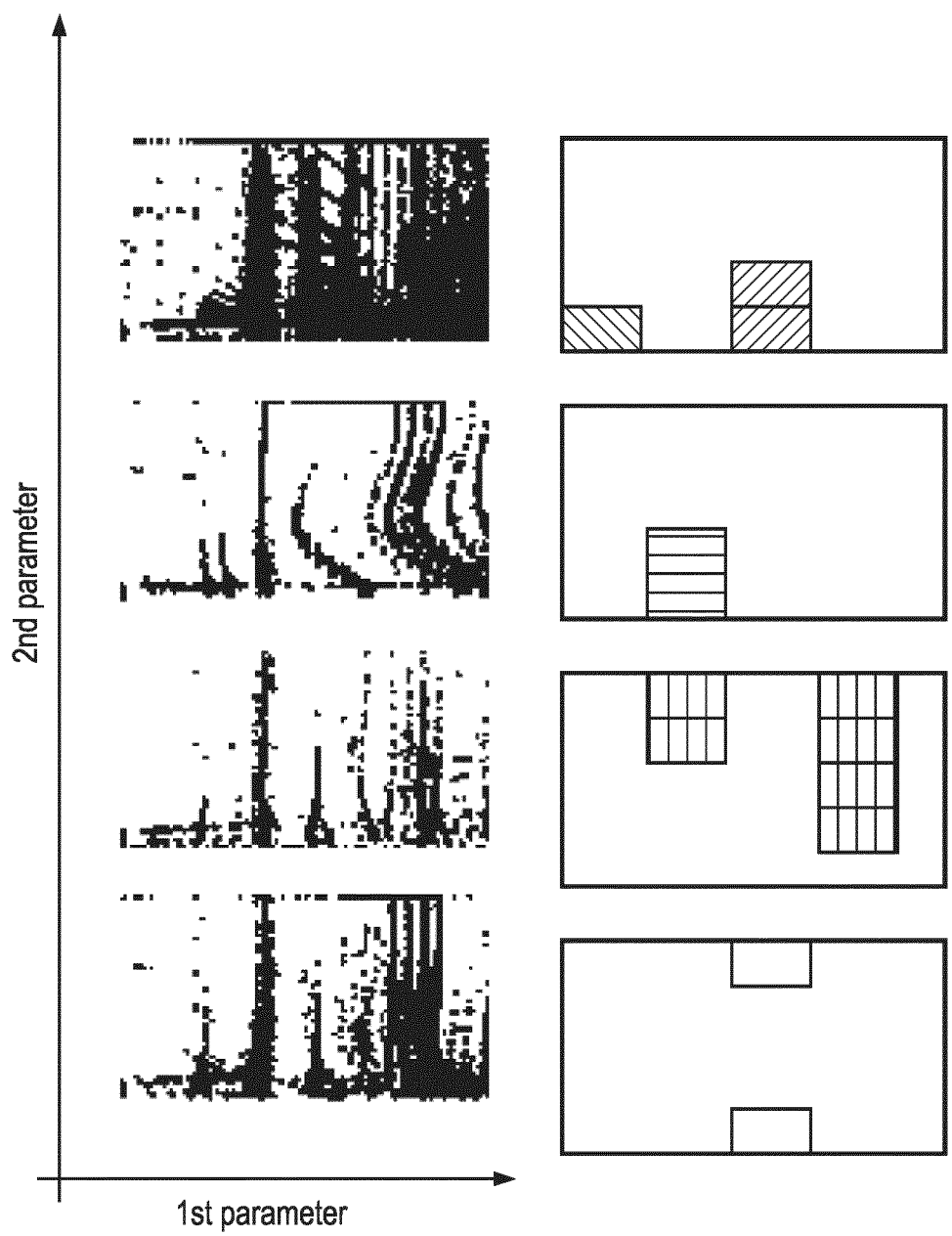
FIG. 1 shows raw scatter plot of exposures and 2D maps/histograms containing exposures per combination of exposure time and tube current according to an exemplary embodiment of the present invention.

The illustration in the drawings is purely schematic and does not intend to provide scaling relations or size information. In different drawings, similar or identical elements are provided with the same reference numerals.

Generally, identical parts, units, entities or steps are provided with the same reference symbols in the description.

FIG. 1 shows raw scatter plot of exposures and 2D maps/histograms containing exposures per combination of exposure time and tube current according to an exemplary embodiment of the present invention.

According to an exemplary embodiment of the present invention, the generated deployment fingerprint data set is a 2-dimensional array, e.g. a 2D data set, having a first deployment parameter of the X-ray tube as a row address and a second deployment parameter of the X-ray tube as a column address.

According to an exemplary embodiment of the present invention, the generated deployment fingerprint data set is a 2-dimensional array, e.g. a 2D data set of a cumulated histogram of exposures sorted by tube current and exposure time on x- and y-axis.

According to an exemplary embodiment of the present invention, a tube fingerprint is a 2D cumulated histogram of exposures sorted by tube current and exposure time on x- and y-axis, respectively.

According to an exemplary embodiment of the present invention, each or at least one entry of the generated deployment fingerprint data set contains the number of exposures for a certain combination of those two.

According to an exemplary embodiment of the present invention, the entries of the generated deployment fingerprint data set could be normalized, or not normalized, they could be clamped or not.

According to an exemplary embodiment of the present invention, the tube fingerprints or histograms form a 2D, single channel input for the regression network, as shown in FIG. 1 for examples of tube fingerprints.

According to an exemplary embodiment of the present invention, a generated deployment fingerprint data set could also have other dimensions on the axes, e.g. the tube voltage, kV, vs. the dose, mAs.

According to an exemplary embodiment of the present invention, a generated deployment fingerprint data set could be a 3D histogram with kV, mA, ms on the three axis.

According to an exemplary embodiment of the present invention, a generated deployment fingerprint data set in 2D with exposure current vs. time is suitable for prediction of X-ray tube failures.

Figure 2:
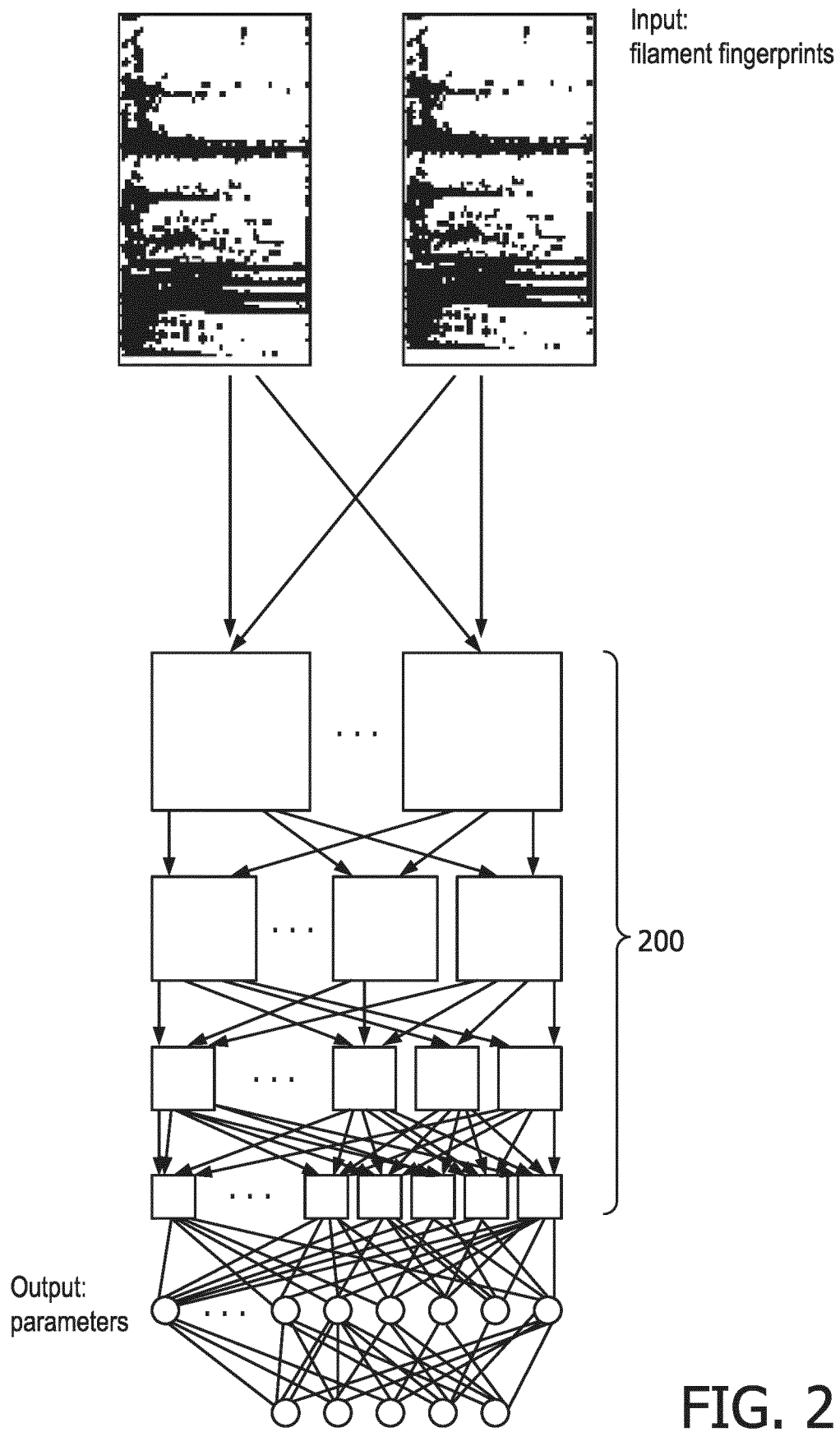
FIG. 2 shows exemplary regression model for prediction of tube lifetime parameters from tube fingerprints according to an exemplary embodiment of the present invention.

FIG. 2 shows exemplary regression model for prediction of tube lifetime parameters from tube fingerprints according to an exemplary embodiment of the present invention.

An exemplary network architecture of the regression network 200 could use single channel 2D input images to predict the numerical lifetime parameters. According to an exemplary embodiment of the present invention, the network architecture of the regression network could of an input layer of size n×m, adapted to the number of buckets per exposure time and tube current used in the 2D histogram.

According to an exemplary embodiment of the present invention, the input layer is followed by k dense layers that condense spatially and expands into multiple features. Finally, a fully connected layer converts feature responses into dedicated lifetime parameters as output.

According to an exemplary embodiment of the present invention, for X-ray tubes with several filaments the number of input channels can be adapted to the number of filaments of the tube.

According to an exemplary embodiment of the present invention, for X-ray tubes with known failures, the present invention can easily collect training data by generating the tube fingerprint and counting the remaining number of exposures, days of use, etc. until failure. Once training has converged the model can be used to predict the lifetime for tubes that have not yet failed.

According to an exemplary embodiment of the present invention, the lifetime parameters include but are not limited to (see also output parameters of FIG. 2):
i) remaining number of exposure per filament
ii) total lifetime in number of exposures or days
iii) remaining lifetime in number of exposures or days
iv) probability per failure mode, e.g. filament defect, arcing, anode defect, bearing defect, vacuum loss or any other defect of a component of the X-ray tube or an overall defect of the X-ray tube as such.

In the most simple embodiment, the lifetime is the prediction outcome of the model for a given tube fingerprint or distinct fingerprints for the different filaments per input channel.

In another embodiment the predictions are put together derived from an ensemble of multiple tube fingerprints in the history of the tube usage.

In yet another embodiment these ensemble predictions are weighted, e.g. by putting a higher weight for more recent fingerprints and a lower weight for oldest fingerprints.

Figure 3:
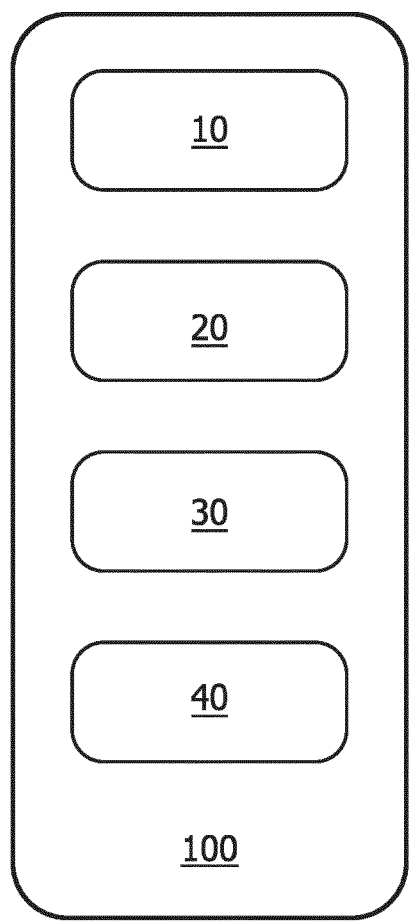
FIG. 3 shows a block diagram of a computer implemented system for predicting X-ray tube degradation according to an exemplary embodiment of the present invention.

FIG. 3 shows a block diagram of a computer implemented system for predicting X-ray tube degradation according to an exemplary embodiment of the present invention.

The system 100 for predicting X-ray tube degradation comprises a generator 10, a database 20, and a neural network 30.

The generator 10 is configured to generate a deployment fingerprint data set for recording cumulative radiation exposure of a currently deployed X-ray tube.

The database 20 is configured to provide a training data set comprising multiple tube fingerprint data sets for recording cumulative radiation exposure of previously deployed X-ray tubes correlated with failures of the previously deployed X-ray tubes; and The neural network 30, 200 is configured to be trained using the training data set and configured to predict at least one parameter of the currently deployed X-ray tube based on the training.

According to an exemplary embodiment of the present invention, the system may further comprise a controlling device 40 configured to control the currently deployed X-ray tube and/or to initialize a service action for the currently deployed X-ray tube.

According to an exemplary embodiment of the present invention, the system allows for predictive maintenance and predictive service for X-ray systems each and every X-ray pulse is logged and can be used for analysis. As the tube is one of the parts that has a limited lifetime and has to be exchanged over the system's period of use it is desirable to predict tube failure in order to be able to react quickly after failure or even pro-actively exchange it prior to failure.

According to an exemplary embodiment of the present invention, the system allows to generate tube fingerprints for any exposure the tube has been used for. Using a multitude of these fingerprints a regression network is trained to predict lifetime parameters such as the remaining number of exposures. During inference it is then possible to deduce the remaining lifetime from a given fingerprint. This helps minimizing system downtime and increasing customer satisfaction as well as allowing a better scheduling of service duties.

Figure 4:
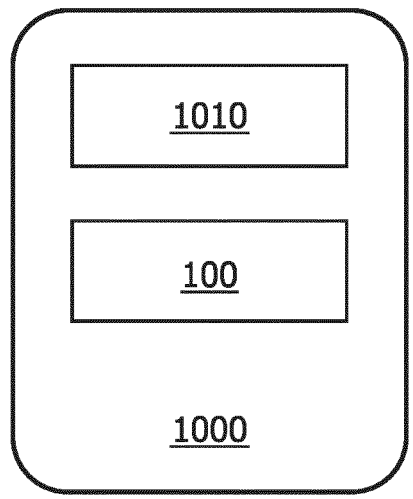
FIG. 4 shows an X-ray imaging arrangement according to an exemplary embodiment of the present invention.

FIG. 4 shows an X-ray imaging arrangement according to an exemplary embodiment of the present invention.

The X-ray imaging arrangement 1000 comprises an X-ray tube 1010 and a system 100 for predicting X-ray tube degradation.

Figure 5:
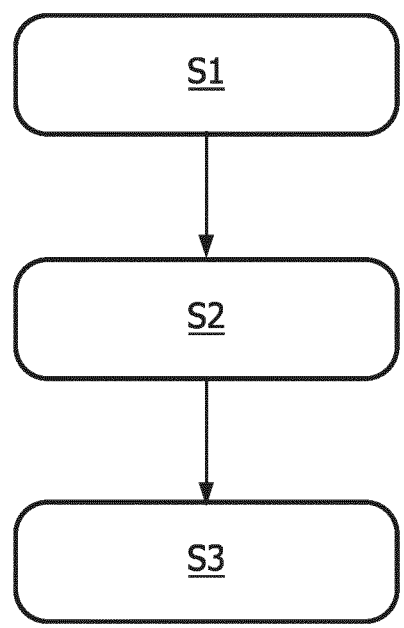
FIG. 5 shows a flow chart of a method for predicting X-ray tube degradation according to an exemplary embodiment of the present invention.

FIG. 5 shows a flow chart of a method for predicting X-ray tube degradation according to an exemplary embodiment of the present invention.

The predicting method for predicting X-ray tube degradation comprises the following steps, As a first step of the method, generating S1 a deployment fingerprint data set for recording cumulative radiation exposure of a currently deployed X-ray tube 1010 is performed.

As a second step of the method, providing S2 a training data set comprising multiple tube fingerprint data sets for recording cumulative radiation exposure of previously deployed X-ray tubes correlated with failures of the previously deployed X-ray tubes 1010 is performed.

Finally, as a third step, using S3 the training data set to train a neural network and predicting at least one parameter of the currently deployed X-ray tube using the trained neural network is performed.

One or more features described herein can be configured or implemented as or with circuitry encoded within a computer-readable medium, and/or combinations thereof. Circuitry may include discrete and/or integrated circuitry, a system-on-a-chip (SOC), and combinations thereof, a machine, a computer system, a processor and memory, a computer program.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A system for predicting X-ray tube degradation, comprising:
   a generator configured to generate a deployment fingerprint data set for recording cumulative radiation exposure of a currently deployed X-ray tube;
   a database configured to provide a training data set comprising multiple tube fingerprint data sets for recording cumulative radiation exposure of previously deployed X-ray tubes correlated with failures of the previously deployed X-ray tubes;
   a neural network configured to be trained using the training data set and configured to predict at least one parameter of the currently deployed X-ray tube based on the training; and
   a controller configured to control the currently deployed X-ray tube and/or to initialize a service action for the currently deployed X-ray tube.

2. The system of claim 1, wherein the neural network is configured to predict expected service lifetime of the currently deployed X-ray tube for a given tube fingerprint.

3. The system of claim 2, wherein the expected service lifetime of the currently deployed X-ray tube is defined by at least one of a remaining number of exposure per filament, a total lifetime in number of exposures or days, a remaining lifetime in number of exposures or days, and a probability per failure mode.

4. The system of claim 3, wherein the probability per failure mode relates to an overall defect of the X-ray tube or a component defect of the X-ray tube, wherein the component defect comprises at least one of a filament defect, an arcing defect, a bearing defect, a vacuum defect, and an anode defect.

5. The system of claim 1, wherein the generated deployment fingerprint data set represents different filaments per an input channel.

6. The system of claim 1, wherein the neural network is configured to predict an ensemble of multiple tube fingerprints of the currently deployed X-ray tube.

7. The system of claim 6, wherein the parameters are weighted to calculate a weighted parameter of the currently deployed X-ray tube.

8. A method for predicting X-ray tube degradation, the method comprising:
   generating a deployment fingerprint data set for recording cumulative radiation exposure of a currently deployed X-ray tube;
   providing a training data set comprising multiple tube fingerprint data sets for recording cumulative radiation exposure of previously deployed X-ray tubes correlated with failures of the previously deployed X-ray tubes;
   using the training data set to train a neural network and predicting at least one parameter of the currently deployed X-ray tube using the trained neural network; and
   controlling the currently deployed X-ray tube and/or initializing a service action for the currently deployed X-ray tube.

9. A non-transitory computer-readable medium for storing executable instructions, which cause a method to be performed to predict X-ray tube degradation, the method comprising:
   generating a deployment fingerprint data set for recording cumulative radiation exposure of a currently deployed X-ray tube;
   providing a training data set comprising multiple tube fingerprint data sets for recording cumulative radiation exposure of previously deployed X-ray tubes correlated with failures of the previously deployed X-ray tubes;
   using the training data set to train a neural network and predicting at least one parameter of the currently deployed X-ray tube using the trained neural network; and
   controlling the currently deployed X-ray tube and/or initializing a service action for the currently deployed X-ray tube.

* * * * *